T. L. KEPPLER.
PORTABLE SCALE.
APPLICATION FILED APR. 9, 1910.
978,306.
Patented Dec. 13, 1910.
2 SHEETS—SHEET 2.
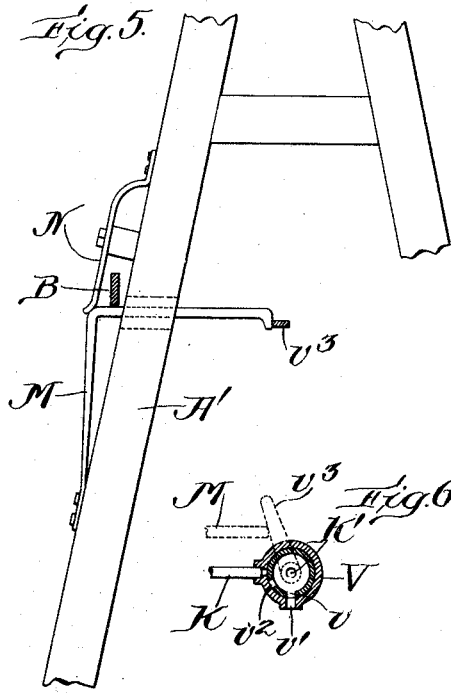
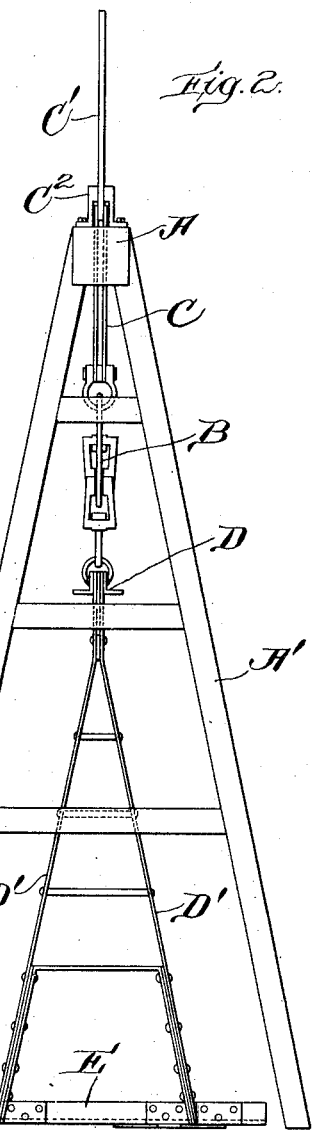
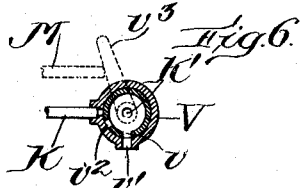
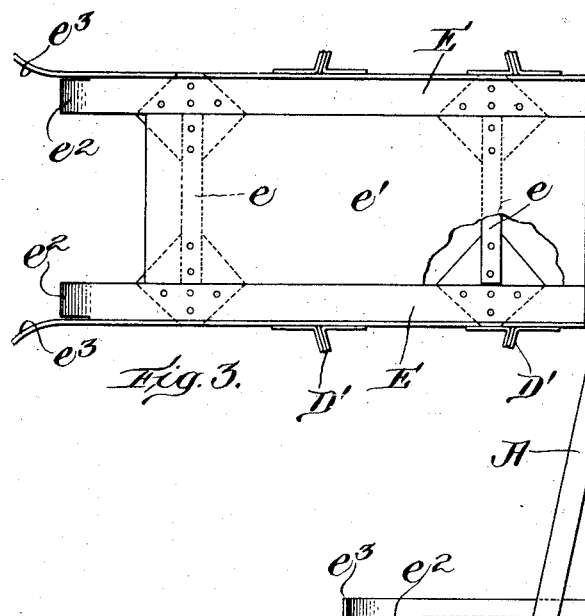
Witnesses:
Inventor:
Theodore L. Keppler;
by Roberts, Roberts & Cushman,
Attys.

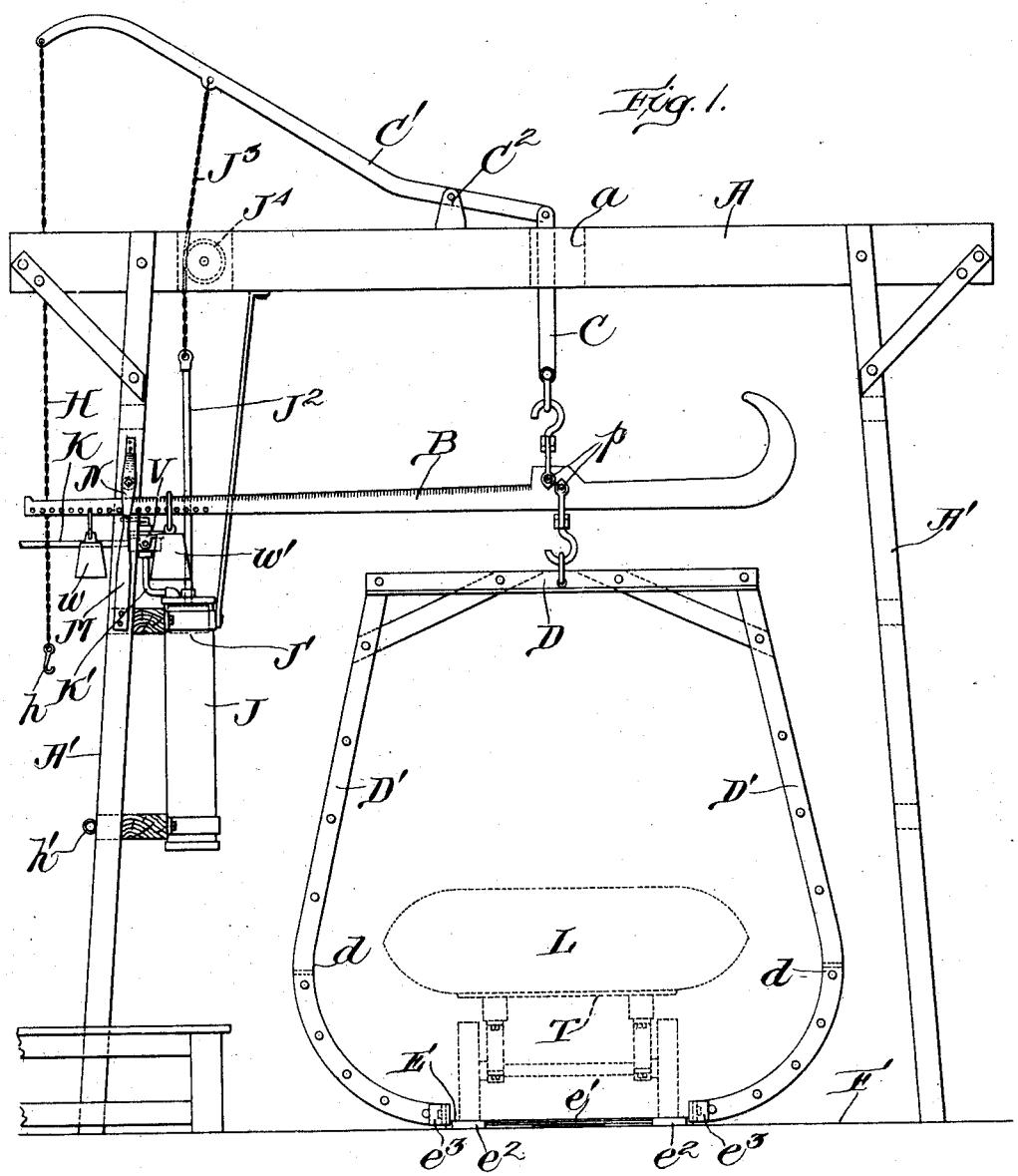

UNITED STATES PATENT OFFICE.

THEODORE L. KEPPLER, OF BROOKLINE, MASSACHUSETTS, ASSIGNOR TO THE AMERICAN SUGAR REFINING COMPANY, OF BOSTON, MASSACHUSETTS, A CORPORATION OF NEW JERSEY.

PORTABLE SCALE.

978,306.  Specification of Letters Patent.  Patented Dec. 13, 1910.

Application filed April 9, 1910. Serial No. 554,523.

*To all whom it may concern:*

Be it known that I, THEODORE L. KEPPLER, a citizen of the United States, and resident of Brookline, in the county of Norfolk and State of Massachusetts, have invented new and useful Improvements in Portable Scales, of which the following is a specification.

This invention relates to scales, and particularly to portable scales for weighing heavy materials, so constructed that a loaded truck may be readily rolled upon the scale platform, the whole weighed, and then rolled off again without the necessity of unloading the truck and reloading it at the scale. Hitherto, so far as I am aware, this had been possible only with stationary or non-portable scales, such as ordinary hay scales, which are permanently built in so that the platform forms a part of the floor. For many purposes such scales are unsatisfactory and ill adapted to the conditions under which the weighing must be done. For example, in weighing merchandise while being discharged from vessels at docks, the merchandise frequently has to be weighed not only by customs officials, but also by private weighers, and if stationary scales are installed for the purpose they will frequently be at places not convenient for the rapid unloading and disposal of the goods Incoming vessels will necessarily lie at various berths and it is highly desirable that scales be located in the direct line taken by the stevedores in carrying the goods from the vessel to their place of storage or other destination. This can be accomplished only by the use of portable scales which may be placed in the exact position where most convenient for weighing the cargo as it comes from the vessel. Furthermore, the weighing mechanism of stationary scales is necessarily partly below the floor, since the scale platform constitutes a permanent part of the floor, and the rest of the weighing mechanism is for the most part concealed, so that if anything happens through accident or design to render the scale inaccurate, such defect is difficult to detect and remedy. The ordinary portable scales hertofore used for the purpose overcome certain of the objections to the stationary or built-in scales, in that they may be placed in the most convenient location, and that the weighing mechanism may be wholly exposed and subject to inspection. Ordinary portable scales, however, are open to other objections hardly less serious, since they are equipped with scale pans or platforms upon which the merchandise must be lifted from the truck upon which it is carried from the vessel, and after it is weighed must be again lifted from the scale pan to the truck to be carried away for repeated weighing or to its place of storage or other destination. The handling of the merchandise in placing it from the truck upon the scales and then back again upon the truck, especially when the operation is repeated for repeated weighings, involves no small amount of labor when it be remembered that each package may weigh several hundred pounds, and consumes no small amount of time, and subjects the merchandise to damage on account of repeated handling especially when hooks are used which is indispensable in the handling of certain kinds of merchandise.

The principal object of the present invention is to eliminate the handling of the goods at the scales, and to provide a portable scale which can be moved about at will and upon which a loaded truck can be readily rolled, weighed and wheeled away again without touching the load, so that, notwithstanding the load may be weighed several times, it need not be handled from the time it is placed on the truck on board the vessel until it is finally deposited at its destination. This has been imposible with the portable scales hitherto in vogue.

In carrying out my invention I provide a portable frame from which is suspended the weighing device, including a platform which normally rests upon the floor and is adapted to permit a truck to be readily rolled on and off. The weighing device and the platform may be lifted bodily together until the platform with its load is clear of the floor, and the load is then weighed in the usual way, after which the weighing device and platform are again lowered to the floor for the removal of the truck.

These and other features will hereinafter be more particularly pointed out.

In the accompanying drawings,—Figure 1 is a side elevation of a portable scale embodying my invention; Fig. 2 is an end view of the scale shown in Fig. 1 viewed from the right; Fig. 3 is a plan view of the scale platform shown in Figs. 1 and 2; Fig. 4 is a cross-section of said platform somewhat enlarged. Fig. 5 is a fragmentary view in elevation, somewhat enlarged, showing part of the pneumatic operating device viewed from the right of Fig. 1; and Fig. 6 is a detail view showing in horizontal section a two-way valve forming part of the pneumatic operating device.

The portable supporting frame, which may be of usual construction, consists of the cross-bar A and the legs A'. While in certain aspects of the invention no particular form of weighing mechanism is essential, I have herein shown a weighing mechanism comprising a scale beam or steel yard B of ordinary construction, suspended from the cross beam A by the bar C, which is not secured directly to the cross beam A, but passes through a slot $a$ therein and is pivoted at its upper end to the operating lever C'. The operating lever C' has its fulcrum on a bracket $C^2$ mounted on top of the cross beam A. The steel yard B is provided with the usual weights $w$, $w'$. Suspended from the steel yard B by means of a bail, consisting of a top piece D and forked side pieces D', is my improved truck platform. This platform comprises a pair of sheet metal strips E bent to form an angle, the bottoms of which constitute wheel ways for a truck, and the sides of which constitute wheel guides to prevent the truck from running off the platform. The angle metal wheel ways and guides are suitably spaced apart to correspond with the breadth of the truck to be used, and are connected by the cross-bars $e$. The space between the wheel ways E may be filled and a continuous floor provided by a sheet metal plate $e'$. The forward end, that is, the end at which the truck approaches, of each of the wheel ways E is provided with a downwardly inclined surface, as shown at $e^2$, sloping toward the plane of the floor, so that the truck may be rolled upon the platform with as little jar as possible; and to assist in guiding the truck upon the platform the forward ends of the wheel guides are outwardly flared as shown at $e^3$.

The sides D' of the bail which supports the platform are outwardly bowed as best shown in Fig. 1, the bow or curve being greatest near their lower ends a short distance above the platform as shown at $d$, so as not to interfere with the overhang of the load L carried by the truck T.

The truck platform normally rests upon the floor F, as shown in Fig. 1, and being made of sheet metal is very flat and thin and well adapted to permit the truck T to be rolled thereon as though it were a part of the floor. When the truck is in position upon the platform as shown in Fig. 1, the outer end of lever C' is pulled down, thereby lifting the bar or link C and raising the weighing device and the platform together bodily clear of the floor. The weight is then taken and recorded in the ordinary way, after which the weighing device and platform are again lowered to the floor and the truck and its load rolled off from the platform for storage, further weighing or other disposition. The platform and weighing device may be elevated from the floor as described by hand, in which case a chain H is employed which may be pulled down by the operator, and the hook $h$ be secured to an eye $h'$ on the frame A, to hold the platform in elevated position while the weighing is being done. Or, if it be desired to save the labor of elevating the platform by hand, it may be done by suitable power mechanism or motor, and to this end I have devised a pneumatic operating device consisting of a cylinder J mounted on the legs A' of the frame, having a movable piston J' and piston rod $J^2$. To the upper end of the piston rod $J^2$ is secured a chain $J^3$ which is connected at its upper end with the operating lever C'. A pulley $J^4$ may be mounted in the cross beam A to guide the chain $J^3$ and insure the movement of the piston rod $J^2$ in a vertical line. Air is admitted under pressure to the cylinder J above the piston J' through the air pipe K which may be connected with any suitable source of pneumatic pressure. In the pipe K is a two-way valve V, having an orifice $v$, which registers with an orifice $v'$ open to the atmosphere when the valve is in its normal position and the platform is resting on the floor. A second orifice $v^2$ under these conditions is closed as is the inlet pipe K, (Fig. 6). When it is desired to lift the platform from the floor for the purpose of weighing, the valve handle $v^3$ is turned until the orifice $v^2$ registers with the inlet pipe K, whereupon the orifice $v$ will be closed. Air under pressure will then pass from the inlet pipe K through orifice $v^2$ and thence through pipe K' to the cylinder J, forcing the piston J' downward and thus operating the lever C'. The valve handle $v^3$ may be operated by hand but I have herein shown a device which serves the double purpose of operating the valve handle and of holding the steel yard against unnecessary and undesirable swinging and vibration due to the jar when the truck is being wheeled on and off the platform. This holding device consists of the metal strap N secured to the side of the leg A' (Fig. 5) forming a space or slot through which the steel yard B passes when the weighing mechanism and platform are lowered to the floor. The space made by the holding device N is open at the lower end, and is provided with a gate formed of the angularly shaped spring metal piece M, the vertical arm of which is secured to the leg A', and the horizontal arm of which passes through an aperture in the leg A' into engagement with the valve arm $v^3$. The spring of the vertical arm of the piece M normally tends to hold said piece retracted so that the horizontal arm closes the opening between the end of the piece N and the leg A', as shown in Fig. 5. With the parts in this position and the steel yard B held in the space formed by the parts N, M and A', very slight movement is permitted the steel yard B, which is practically held locked while the truck is being rolled upon the platform or removed therefrom, so that the wear upon the fine pivots, or knife edges $p$, $p$, by which the steel yard is supported and from which the platform is supported on the steel yard, is greatly reduced. When the truck is at rest upon the platform and it is desired to elevate the weighing device and the platform, the spring piece M is pressed inwardly, thus permitting the steel yard B to be removed from the space in which it was confined, and at the same time the inner end of the arm M swings the valve handle $v^3$ so as to admit air to the cylinder J and close the outlet $v^2$ to the atmosphere. The platform will thereby be raised as already described. After the weighing, the valve handle $v^3$ is swung back again by hand, thus cutting off the inlet through pipe K, and opening the cylinder J to the atmosphere through orifice $v'$ which allows the platform again to settle easily to the floor. It will also be understood that when the platform is resting on the floor, the connections between the platform and the scale beam and between the scale beam and its support, are slack and under very slight tension, the weight of the platform being wholly taken by the floor, so that when a truck is wheeled on to the platform, practically no jar or vibration will be communicated to the fine knife edge pivots $p$, $p$.

I claim:

1. A scale comprising a portable supporting frame, weighing mechanism suspended therefrom, a weighing platform suspended from said weighing mechanism, and adapted to normally rest on the floor, said platform being made of two parallel strips of angle iron rigidly fastened together, one side of each strip standing vertically and forming wheel guides while their other sides form wheel ways for trucks and have their forward ends sloping downwardly to the plane of the floor, and means to lift said weighing mechanism and platform together bodily away from the floor to weigh the load on said platform and to lower the same again to the floor.

2. In a scale comprising a portable supporting frame, weighing mechanism suspended therefrom, a platform suspended from said weighing mechanism normally resting on the floor and with the weighing mechanism adapted to be lifted, said platform comprising a pair of angle wheel-ways spaced apart and rigidly connected, and a bail for suspending said platform comprising an upstanding frame on each side of the same bowed outwardly for a short distance and then converging slightly upward in straight lines.

3. A scale comprising a supporting frame, weighing mechanism suspended therefrom, a truck platform suspended from the weighing mechanism normally resting on the floor and adapted when so resting on the floor to permit trucks to be readily rolled thereon, and pneumatic means to lift said weighing mechanism and truck platform together bodily away from the floor to weigh the load carried by said platform and to lower the same again to the floor.

4. A scale comprising a supporting frame, weighing mechanism suspended therefrom, a truck platform suspended from the weighing mechanism normally resting on the floor and adapted when so resting on the floor to permit trucks to be readily rolled thereon, means to lift said weighing mechanism and truck platform together bodily away from the floor to weight the load carried by said platform and to lower the same again to the floor, said means comprising a motor, and means to control said motor.

5. A scale comprising a supporting frame, a scale beam suspended therefrom, a truck platform suspended from the scale beam and normally resting on the floor adapted to permit tracks to be readily rolled thereon, a holding device to prevent the swing of the scale beam while the platform is resting on the floor, pneumatic means to lift the scale beam and platform together bodily away from the floor and to lower the same again to the floor, and means to release said scale beam from said holding device and at the same time to operate said pneumatic lifting means.

Signed by me at Boston, Massachusetts this sixth day of April 1910.

THEODORE L. KEPPLER.

Witnesses:
ROBERT CUSHMAN,
CHARLES D. WOODBERRY.